(12) United States Patent
Sierra et al.

(10) Patent No.: US 8,181,703 B2
(45) Date of Patent: *May 22, 2012

(54) METHOD USEFUL FOR CONTROLLING FLUID LOSS IN SUBTERRANEAN FORMATIONS

(75) Inventors: Leopoldo Sierra, Houston, TX (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/485,199

(22) Filed: Jul. 12, 2006

(65) Prior Publication Data

US 2006/0283592 A1    Dec. 21, 2006

Related U.S. Application Data

(63) Continuation-in-part of application No. 11/360,215, filed on Feb. 22, 2006, which is a continuation-in-part of application No. 11/102,062, filed on Apr. 8, 2005, which is a continuation-in-part of application No. 10/881,198, filed on Jun. 29, 2004, now Pat. No. 7,117,942, and a continuation-in-part of application No. 10/760,443, filed on Jan. 20, 2004, now Pat. No. 7,759,292, which is a continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
*E21B 33/13* (2006.01)
*E21B 43/26* (2006.01)
*E21B 43/25* (2006.01)

(52) U.S. Cl. ............. 166/281; 166/308.1; 166/307
(58) Field of Classification Search .................. None
See application file for complete search history.

(56) References Cited

U.S. PATENT DOCUMENTS

| | | | |
|---|---|---|---|
| 2,278,838 | A | 4/1942 | Groote et al. |
| 2,670,329 | A | 2/1954 | Jones |
| 2,687,375 | A | 8/1954 | Fischer et al. |
| 2,689,244 | A | 9/1954 | Jones |

(Continued)

FOREIGN PATENT DOCUMENTS

DE    2 250 552    4/1974

(Continued)

OTHER PUBLICATIONS

Office Action dated Mar. 26, 2008 from U.S. Appl. No. 10/862,132.

(Continued)

*Primary Examiner* — Angela M DiTrani
(74) *Attorney, Agent, or Firm* — Robert A. Kent; McDermott Will & Emery LLP

(57) ABSTRACT

Methods that include a method comprising: providing a treatment fluid comprising an aqueous base fluid and a relative permeability modifier, wherein the relative permeability comprises a water-soluble polymer having hydrophobic or hydrophilic modification; introducing the treatment fluid into an interval of a well bore penetrating the subterranean formation; creating one or more perforations through a hydrajetting tool in the interval of the well bore, wherein the perforations extend from the well bore and into the subterranean formation; and allowing the treatment fluid to contact a portion of the subterranean formation.

21 Claims, 1 Drawing Sheet

U.S. PATENT DOCUMENTS

| | | | |
|---|---|---|---|
| 2,819,278 A | 1/1958 | De Groots et al. | |
| 2,843,573 A | 7/1958 | Melamed | 526/260 |
| 2,863,832 A | 12/1958 | Perrine | 252/8.55 |
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,052,298 A | 9/1962 | Mallot | |
| 3,065,247 A | 11/1962 | De Groots et al. | |
| 3,138,205 A | 6/1964 | Kerver et al. | |
| 3,215,199 A | 11/1965 | Dilgren | 166/38 |
| 3,251,415 A | 5/1966 | Bombardieri et al. | 166/42 |
| 3,251,778 A | 5/1966 | Dickson | 252/82 |
| 3,258,428 A | 6/1966 | Dickson | 252/180 |
| 3,265,512 A | 8/1966 | Dickson | 106/14 |
| 3,271,307 A | 9/1966 | Dickson et al. | 300/152 |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,347,789 A | 10/1967 | Dickson | 252/9.55 |
| 3,382,924 A | 5/1968 | Veley et al. | 166/42 |
| 3,404,114 A | 10/1968 | Snyder et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,601,194 A | 8/1971 | Gallus | 166/283 |
| 3,615,794 A | 10/1971 | Nimerick | |
| 3,637,656 A | 1/1972 | Germino et al. | |
| 3,647,507 A | 3/1972 | Ashcraft | 427/288 |
| 3,647,567 A | 3/1972 | Schweri et al. | 428/463 |
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,818,991 A | 6/1974 | Nimerick | |
| 3,902,557 A | 9/1975 | Shaughnessy et al. | |
| 3,910,862 A | 10/1975 | Barabas et al. | 260/79.3 MU |
| 3,943,060 A | 3/1976 | Martin et al. | |
| 3,983,941 A | 10/1976 | Fitch | |
| 4,029,544 A | 6/1977 | Jarowenko et al. | |
| 4,052,343 A | 10/1977 | Cunningham | 521/32 |
| 4,052,345 A | 10/1977 | Austin et al. | 521/129 |
| 4,129,183 A | 12/1978 | Kalfoglou | 166/300 |
| 4,129,534 A | 12/1978 | Cunningham | 521/38 |
| 4,142,595 A | 3/1979 | Anderson et al. | |
| 4,152,274 A | 5/1979 | Phillips et al. | |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A | 12/1981 | Blair, Jr. | |
| 4,337,828 A | 7/1982 | Blair, Jr. | |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,409,110 A | 10/1983 | Borchardt et al. | |
| 4,439,334 A | 3/1984 | Borchardt | 252/8.55 D |
| 4,440,649 A | 4/1984 | Loftin et al. | 252/8.5 C |
| 4,441,556 A | 4/1984 | Powers et al. | |
| 4,447,342 A | 5/1984 | Borchardt et al. | 252/8.55 D |
| 4,460,627 A | 7/1984 | Weaver et al. | 427/212 |
| 4,462,718 A | 7/1984 | McLaughlin et al. | 405/264 |
| 4,499,214 A | 2/1985 | Sortwell | |
| 4,532,052 A * | 7/1985 | Weaver et al. | 507/222 |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,552,670 A | 11/1985 | Lipowski et al. | 507/120 |
| 4,554,081 A | 11/1985 | Borchardt et al. | 252/8.5 A |
| 4,563,292 A | 1/1986 | Borchardt | 252/8.55 R |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,627,926 A | 12/1986 | Peiffer et al. | 252/8.55 R |
| 4,631,138 A | 12/1986 | Johns et al. | |
| 4,662,448 A | 5/1987 | Ashford et al. | |
| 4,671,883 A | 6/1987 | Connell et al. | 252/8.515 |
| 4,693,639 A | 9/1987 | Hollenbeak et al. | 405/263 |
| 4,699,722 A | 10/1987 | Dymond et al. | 252/8.551 |
| 4,702,319 A | 10/1987 | Bock et al. | |
| 4,730,028 A | 3/1988 | Bock et al. | 526/225 |
| 4,814,096 A | 3/1989 | Evani | 507/224 |
| 4,828,725 A | 5/1989 | Lai et al. | |
| 4,828,726 A | 5/1989 | Himes et al. | 252/8.553 |
| 4,856,588 A | 8/1989 | Borchardt | |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | 526/287 |
| 4,960,876 A | 10/1990 | Molteni et al. | |
| 4,993,448 A | 2/1991 | Karydas et al. | |
| 5,051,197 A | 9/1991 | Kalfayan et al. | |
| 5,071,934 A | 12/1991 | Peiffer | 526/307 |
| 5,080,809 A | 1/1992 | Stahl et al. | |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,161,615 A | 11/1992 | Hutchins et al. | |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A | 9/1993 | Hale et al. | |
| 5,256,651 A | 10/1993 | Phelps et al. | |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,407,909 A | 4/1995 | Goodhue, Jr. et al. | |
| 5,424,284 A | 6/1995 | Patel et al. | |
| 5,445,223 A | 8/1995 | Nelson et al. | |
| 5,473,059 A | 12/1995 | Yeh | |
| 5,482,116 A * | 1/1996 | El-Rabaa et al. | 166/250.1 |
| 5,566,760 A * | 10/1996 | Harris | 166/308.6 |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,643,460 A | 7/1997 | Marble et al. | |
| 5,646,093 A | 7/1997 | Dino | |
| 5,663,123 A | 9/1997 | Goodhue, Jr. et al. | |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,755,286 A | 5/1998 | Ebinger | |
| 5,887,653 A | 3/1999 | Bishop et al. | 166/281 |
| 5,908,814 A | 6/1999 | Patel et al. | |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A | 2/2000 | Dymond | |
| 6,047,773 A * | 4/2000 | Zeltmann et al. | 166/281 |
| 6,070,664 A | 6/2000 | Dalrymple et al. | 166/281 |
| 6,124,245 A | 9/2000 | Patel | 507/120 |
| 6,162,766 A * | 12/2000 | Muir et al. | 507/267 |
| 6,187,839 B1 | 2/2001 | Eoff et al. | 523/130 |
| 6,194,356 B1 | 2/2001 | Jones et al. | |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 * | 6/2001 | Goodhue et al. | 507/140 |
| 6,253,851 B1 | 7/2001 | Schroeder, Jr. et al. | 166/278 |
| 6,277,900 B1 | 8/2001 | Oswald et al. | 523/130 |
| 6,281,172 B1 | 8/2001 | Warren et al. | |
| 6,283,210 B1 | 9/2001 | Soliman et al. | 166/270 |

| | | | |
|---|---|---|---|
| 6,291,404 B2 | 9/2001 | House | |
| 6,358,889 B1 | 3/2002 | Waggenspack et al. | |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,454,003 B1 | 9/2002 | Chang et al. | |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,520,255 B2 * | 2/2003 | Tolman et al. | 166/281 |
| 6,562,762 B2 | 5/2003 | Cowan et al. | |
| 6,569,983 B1 | 5/2003 | Treybig et al. | 528/102 |
| 6,601,648 B2 | 8/2003 | Ebinger | |
| 6,605,570 B2 | 8/2003 | Miller et al. | |
| 6,607,035 B1 | 8/2003 | Reddy et al. | |
| 6,609,578 B2 | 8/2003 | Patel et al. | 175/64 |
| 6,626,241 B2 | 9/2003 | Nguyen | |
| 6,627,719 B2 | 9/2003 | Whipple et al. | |
| 6,637,517 B2 | 10/2003 | Samuel et al. | |
| 6,656,885 B2 | 12/2003 | House et al. | |
| 6,662,874 B2 * | 12/2003 | Surjaatmadja et al. | 166/308.6 |
| 6,702,044 B2 | 3/2004 | Reddy et al. | |
| 6,710,107 B2 | 3/2004 | Audibert et al. | 524/5 |
| 6,723,683 B2 | 4/2004 | Crossman et al. | |
| 6,743,288 B2 | 6/2004 | Eoff et al. | 106/724 |
| 6,756,345 B2 * | 6/2004 | Pakulski et al. | 507/246 |
| 6,764,981 B1 | 7/2004 | Eoff et al. | |
| 6,767,867 B2 | 7/2004 | Chatterji et al. | 507/216 |
| 6,767,869 B2 | 7/2004 | DiLullo et al. | |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,800,593 B2 * | 10/2004 | Dobson et al. | 507/110 |
| 6,803,348 B2 * | 10/2004 | Jones et al. | 507/221 |
| 6,846,420 B2 | 1/2005 | Reddy et al. | |
| 6,855,672 B2 | 2/2005 | Poelker et al. | |
| 6,872,820 B2 | 3/2005 | Weber et al. | |
| 6,884,760 B1 * | 4/2005 | Brand et al. | 507/140 |
| 6,962,203 B2 | 11/2005 | Funchess | |
| 6,978,836 B2 | 12/2005 | Nguyen et al. | |
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 | 5/2006 | Nguyen | |
| 7,081,439 B2 | 7/2006 | Sullivan et al. | |
| 7,087,554 B2 | 8/2006 | Youngson et al. | |
| 7,091,159 B2 | 8/2006 | Eoff et al. | |
| 7,114,568 B2 | 10/2006 | Eoff et al. | |
| 7,117,942 B2 * | 10/2006 | Dalrymple et al. | 166/278 |
| 7,159,656 B2 | 1/2007 | Eoff et al. | |
| 7,178,610 B2 | 2/2007 | Bell | |
| 7,182,136 B2 * | 2/2007 | Dalrymple et al. | 166/281 |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,273,099 B2 | 9/2007 | East, Jr. et al. | |
| 7,398,825 B2 | 7/2008 | Nguyen et al. | |
| 7,427,583 B2 | 9/2008 | Couillet et al. | |
| 7,563,750 B2 | 7/2009 | Eoff et al. | |
| 7,589,048 B2 * | 9/2009 | Eoff et al. | 507/212 |
| 7,595,283 B2 | 9/2009 | Eoff et al. | |
| 7,759,292 B2 | 7/2010 | Eoff et al. | |
| 8,008,235 B2 | 8/2011 | Eoff et al. | |
| 8,091,638 B2 | 1/2012 | Dusterhoft et al. | |
| 2002/0123433 A1 | 9/2002 | Goodhue, Jr. et al. | |
| 2003/0013871 A1 | 1/2003 | Mallon et al. | |
| 2003/0019627 A1 | 1/2003 | Qu et al. | 166/281 |
| 2003/0104948 A1 | 6/2003 | Poelker et al. | |
| 2003/0114317 A1 | 6/2003 | Benton et al. | |
| 2003/0139298 A1 | 7/2003 | Fu et al. | |
| 2003/0191030 A1 | 10/2003 | Blair et al. | 507/225 |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0209780 A1 * | 10/2004 | Harris et al. | 507/117 |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2005/0194140 A1 | 9/2005 | Dalrymple et al. | 166/279 |
| 2005/0211439 A1 * | 9/2005 | Willett et al. | 166/308.1 |
| 2005/0230114 A1 | 10/2005 | Eoff et al. | |
| 2005/0230116 A1 | 10/2005 | Eoff et al. | 166/305.1 |
| 2005/0284632 A1 | 12/2005 | Dalrymple et al. | |
| 2006/0016596 A1 | 1/2006 | Pauls et al. | |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2007/0012445 A1 | 1/2007 | Nguyen et al. | |
| 2007/0114032 A1 | 5/2007 | Stegent et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |
| 2010/0276152 A1 | 11/2010 | De Wolf et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2 335 428 A | 9/1999 |
| WO | WO 93/15164 | 9/1993 |
| WO | WO 99/49183 | 9/1999 |
| WO | WO 99/49183 A1 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 A1 | 7/2003 |
| WO | WO 2004/022667 | 3/2004 |
| WO | WO 2004/094781 | 11/2004 |
| WO | WO 2004/101706 A1 | 11/2004 |

OTHER PUBLICATIONS

Office Action dated Mar. 26, 2008 from U.S. Appl. No. 11/360,215.
Office Action dated Apr. 3, 2008 from U.S. Appl. No. 10/760,443.
Foreign Communication from a Related Counterpart Application dated Oct. 9, 2007.
International Search Report and Written Opinion for Application No. PCT/GB2007/002633, Jul. 12, 2007.
Office Action dated Feb. 1, 2008 from U.S. Appl. No. 10/440,337.
Office Action dated May 22, 2008 from U.S. Appl. No. 11/102,062.
U.S. Appl. No. 12/080,647, filed Apr. 4, 2008.
U.S. Appl. No. 10/763,800, filed Jan. 24, 2004, Eoff, et al.
U.S. Appl. No. 10/780,995, filed Feb. 18, 2004, Eoff, et al.
U.S. Appl. No. 10/806,894, filed Mar. 23, 2004, Eoff, et al.
U.S. Appl. No. 10/825,001, filed Mar. 15, 2004, Eoff, et al.
U.S. Appl. No. 10/872,997, filed Jun. 21, 2004, Eoff, et al.
U.S. Appl. No. 10/881,198, filed Jun. 29, 2004, Dalrymple, et al.
U.S. Appl. No. 10/893,210, filed Jul. 16, 2004, Eoff, et al.
U.S. Appl. No. 11/102,062, filed Apr. 8, 2005, Sierra, et al.
U.S. Appl. No. 11/183,028, Nguyen, et al.
U.S. Appl. No. 11/360,215, filed Feb. 22, 2006, Dusterhoft, et al.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.
Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Information*, Aug. 1, 2001, pp. 1-2.
BJ Services Company, *Aquatrol I, Product Information*, Dec. 14, 2000, pp. 1-2.
Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000, printed from website @ http://speonline.spe.org.
Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000, printed from website @ http://speonline.spe.org.
Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002, printed from website @ http://speonline.spe.org.
Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003, printed from website @ http://speonline.spe.org.
Xu, et al., *Modeling of Laser Spallation Drilling of Rocks for Gas— and Oilwell Drilling*, SPE 95746, 2005, Society of Petroleum Engineers Inc., presented at the 2005 SPE Annual Technical Conference and Exhibition held in Dallas, Texas, Oct. 9-12, 2005, printed from website @ http://speonline.spe.org.
Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.
Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004, printed from website @ http://speonline.spe.org.
Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005, printed from website @ http://speonline.spe.org.
Office Action dated Jun. 13, 2008 from U.S. Appl. No. 10/806,894.
Office action dated Nov. 16, 2007 from U.S. Appl. No. 10/760,443.
Office action dated Aug. 8, 2007 from U.S. Appl. No. 10/760,443.
Office action dated Feb. 21, 2007 from U.S. Appl. No. 10/760,443.
Office action dated Oct. 6, 2006 from U.S. Appl. No. 10/760,443.
Office action dated Mar. 23, 2006 from U.S. Appl. No. 10/760,443.
Office action dated Dec. 28, 2007 from U.S. Appl. No. 10/806,894.
Office action dated Jul. 12, 2007 from U.S. Appl. No. 10/806,894.
Office action dated Apr. 9, 2007 from U.S. Appl. No. 10/806,894.
Office action dated Jan. 3, 2007 from U.S. Appl. No. 10/806,894.
Office action dated Jul. 3, 2006 from U.S. Appl. No. 10/806,894.
Notice of allowance dated Jan. 28, 2008 from U.S. Appl. No. 11/102,062.
Office action dated Jun. 27, 2007 from U.S. Appl. No. 11/102,062.
Office action dated May 1, 2007 from U.S. Appl. No. 11/122,836.
Office action dated Nov. 14, 2007 from U.S. Appl. No. 11/122,836.
Office action dated Nov. 15, 2006 from U.S. Appl. No. 10/440,337.
Office action dated May 3, 2006 from U.S. Appl. No. 10/440,337.
Notice of allowance dated Mar. 23, 2006 from U.S. Appl. No. 10/236,722.
Office action dated Sep. 28, 2005 from U.S. Appl. No. 10/236,722.
Office action dated Jul. 5, 2005 from U.S. Appl. No. 10/236,722.
Office action dated Apr. 19, 2005 from U.S. Appl. No. 10/236,722.
Office action dated Oct. 20, 2004 from U.S. Appl. No. 10/236,722.
Notice of allowance dated Mar. 23, 2006 from U.S. Appl. No. 10/612,271.
Notice of allowance dated Jul. 18, 2006 from U.S. Appl. No. 10/825,001.
Office action dated Jan. 6, 2006 from U.S. Appl. No. 10/825,001.
Notice of allowance dated Aug. 17, 2006 from U.S. Appl. No. 10/881,198.
Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210.
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Sep. 24, 2007 from U.S. Appl. No. 10/862,132.
Office action dated Jul. 12, 2007 from U.S. Appl. No. 10/862,132.
Office action dated Jan. 22, 2007 from U.S. Appl. No. 10/862,132.
Office action dated Jul. 28, 2006 from U.S. Appl. No. 10/862,132.
Office Action for U.S. Appl. No. 11/360,215 dated Sep. 17, 2008.
Office Action mailed Oct. 31, 2008, for U.S. Appl. No. 10/862,132.
Office Action mailed Nov. 18, 2008, for U.S. Appl. No. 11/122,836.
Office Action mailed Nov. 17, 2008, for U.S. Appl. No. 11/471,148.
Office Action mailed Nov. 18, 2008, for U.S. Appl. No. 11/471,738.
Office Action from U.S. Appl. No. 10/440,337 mailed Sep. 25, 2008.
Office Action from U.S. Appl. No. 11/102,062 mailed Sep. 23, 2008.
Office Action from U.S. Appl. No. 11/501,595 mailed Sep. 24, 2008.
Office Action for U.S. Appl. No. 10/806,894, mailed Dec. 17, 2008.
Office Action for U.S. Appl. No. 10/760,443, mailed Dec. 23, 2008.
Office Action for U.S. Appl. No. 10/862,132, dated Apr. 28, 2009.
Office Action for U.S. Appl. No. 11/360,215, dated Apr. 28, 2009.
Office Action for U.S. Appl. No. 11/122/836, dated May 13, 2009.
Office Action for U.S. Appl. No. 11/471,148, dated May 20, 2009.
Notice of Allowance and Notice of Allowability for U.S. Appl. No. 11/471,738, dated May 28, 2009.
Office Action for U.S. Appl. No. 10/806,894, dated Jul. 10, 2009.
Office Action for U.S. Appl. No. 11/501,595, dated Aug. 17, 2009.
Office Action for U.S. Appl. No. 11/102,062 dated Jun. 29, 2010.
Office Action for U.S. Appl. No. 11/501,595 dated Jun. 29, 2010.
Office Action for U.S. Appl. No. 11/360,215 dated Jun. 9, 2010.
Office Action for U.S. Appl. No. 11/102,062, dated Nov. 12, 2009.
Office Action for U.S. Appl. No. 11/122,836 dated Jul. 22, 2010.
Office Action for U.S. Appl. No. 11/360,215 dated Dec. 7, 2009.
Office Action for U.S. Appl. No. 10/862,132 dated Dec. 30, 2009.
Office Action for U.S. Appl. No. 11/501,595 dated Feb. 5, 2010.
Office Action for U.S. Appl. No. 11/122,836 dated Feb. 22, 2010.
Office Action for U.S. Appl. No. 11/102,062 dated Feb. 24, 2010.

Notice of Allowance for U.S. Appl. No. 10/760,443 dated Feb. 8, 2010.
Notice of Allowance for U.S. Appl. No. 10/862,132 dated Apr. 1, 2010.
Office Action for U.S. Appl. No. 10/806,894 dated Apr. 1, 2010.
Office Action for U.S. Appl. No. 11/102,062 dated Nov. 18, 2010.
Office Action for U.S. Appl. No. 10/806,894 dated Oct. 5, 2010.
Office Action for U.S. Appl. No. 12/533,150 dated Jan. 7, 2011.
Office Action for U.S. Appl. No. 11/360,215 dated Sep. 8, 2010.
Office Action for U.S. Appl. No. 11/501,595 dated Feb. 8, 2011.
Office Action for U.S. Appl. No. 11/360,215 dated Feb. 8, 2011.
Office Action for U.S. Appl. No. 10/806,894 dated Mar. 17, 2011.
Office Action for U.S. Appl. No. 11/102,062 dated Mar. 23, 2011.
Office Action for U.S. Appl. No. 11/122,836 dated Apr. 29, 2011.
Office Action for U.S. Appl. No. 12/533,150 dated Jun. 10, 2011.
Office Action for U.S. Appl. No. 11/501,595 dated Jun. 27, 2011.
Office Action for U.S. Appl. No. 11/102,062 dated Jun. 29, 2011.
Office Action for U.S. Appl. No. 11/360,215 dated Jul. 5, 2011.

* cited by examiner

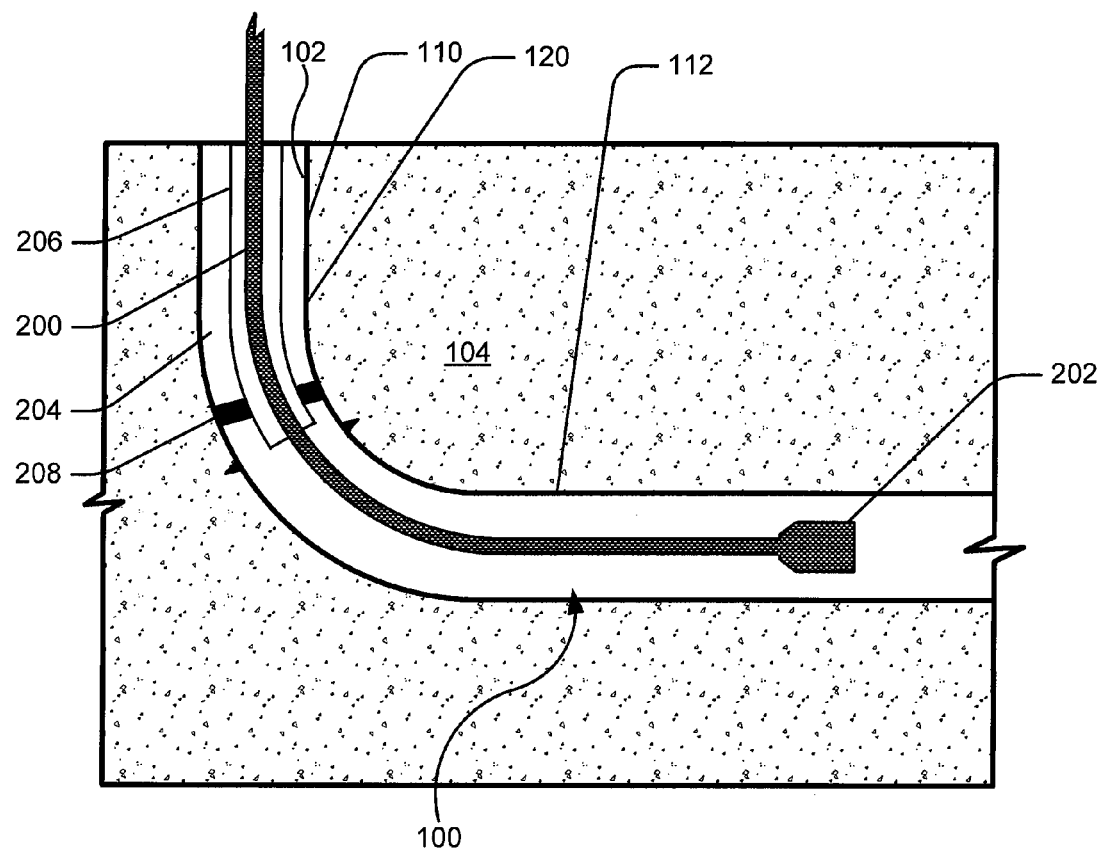

METHOD USEFUL FOR CONTROLLING FLUID LOSS IN SUBTERRANEAN FORMATIONS

CROSS-REFERENCE TO RELATED APPLICATIONS

This application is a continuation-in-part of U.S. application Ser. No. 11/360,215 filed on Feb. 22, 2006, which is a continuation-in-part of U.S. application Ser. No. 11/102,062 filed on Apr. 8, 2005, which is a continuation-in-part of U.S. application Ser. No. 10/881,198 filed on Jun. 29, 2004 now U.S. Pat. No. 7,117,942 and U.S. patent application Ser. No. 10/760,443 filed on Jan. 20, 2004 now U.S. Pat. No. 7,759,292, which is a continuation-in-part of U.S. application Ser. No. 10/440,337 filed on May 16, 2003 now abandoned, and U.S. application Ser. No. 10/612,271 filed on Jul. 2, 2003 now U.S. Pat. No. 7,182,136, the entire disclosures of which are incorporated by reference.

BACKGROUND

The present invention provides improvements in the production of hydrocarbons from subterranean formations. More particularly, the present invention provides improved solutions and methods for fracture stimulation in a subterranean formation while using a relative permeability modifier to reduce fluid leak off therefrom.

One method typically used to increase the effective drainage area of well bores penetrating subterranean formations is fracture stimulation. Fracture stimulation, or "fracturing," comprises pumping a fracturing fluid into a well bore at a certain pressure and against a selected surface of a subterranean formation intersected by the well bore to create or enhance a fracture therein.

Fracture stimulation may be used in both vertical and horizontal wells. Fracturing horizontal wells may be undertaken in several situations, including situations where the formation has: (1) restricted flow caused by low vertical permeability, the presence of shale streaks or formation damage; (2) low productivity due to low formation permeability; (3) natural fractures in a direction different from that of induced fractures, thus induced fractures have a high chance of intercepting the natural fractures; or (4) low stress contrast between the pay zone and the surrounding layers. In the fourth case, a large fracturing treatment of a vertical well likely would not be an acceptable option since the fracture would grow in height as well as length. Drilling a horizontal well and creating either several transverse or longitudinal fractures may be preferable as they may allow rapid depletion of the reservoir through one or more fractures. "Zone" as used herein simply refers to a portion of the formation and does not imply a particular geological strata or composition.

Selective or pinpoint fracture stimulation of horizontal open hole wells may be performed if desired using coiled tubing or normal tubing and a specialized fracture-jetting tool located at the end. The normal selective or pinpoint fracture stimulation involves pumping stimulation fluids through the tubing and the annular space, both at rates and pressures sufficient to create or enhance a fracture in the formation. For example, for carbonate formations, a "reactive" fluid (as judged by the composition of the formation) such as acid is pumped through the tubing side and at the same time a "nonreactive" fluid (as judged by the composition of the formation) is pumped through the annular space. In the case of a carbonate formation, a water-based fluid may be the nonreactive fluid. Both fluids are mixed downhole and are responsible for the fracture creation or enhancement.

In some circumstances, however, the fracturing process may terminate prematurely, for a variety of reasons. For example, the "nonreactive" portion of the stimulation fluid, which usually is intended to advance as the fracture progresses, may undesirably completely leak off into the formation and result in an inefficient fracture stimulation of the well. This undesired loss or leak off is commonly referred to as "fluid loss." In fracturing treatments, fluid loss into the formation may result in a reduction in fluid efficiency, such that the fracturing fluid cannot propagate the fracture(s) as desired. As used herein, the term "treatment," or "treating," refers to any subterranean treatment that uses a fluid in conjunction with a desired function and/or for a desired purpose. The term "treatment," or "treating," does not imply any particular action by the fluid or any particular component thereof.

To overcome the problem of such fluid loss into the formation, viscosified or crosslinked fluids may be used. Additional fluid loss control may be provided by crosslinking the gelling agent or by including fluid loss control materials, such as sized solids (e.g., calcium carbonate), silica particles, oil-soluble resins, and degradable particles, in the treatment fluids. However, there are a number of limitations associated with the use of these viscous fluids. For example, their high viscosity may result in higher friction pressures at high rates, which in turn may result in high annular treatment pressures. Well completions dictate the required treatment pressures and rates for the annular space. In most of the cases, to satisfy the completion limitations of the annular space, it is not possible to pump the fluids at high rates to minimize fluid leak off.

In some instances, to prevent fluid loss from occurring, fluid loss control additives may be included in the treatment fluids. Examples of commonly used fluid loss control additives include, but are not limited to, gelling agents, such as hydroxyethylcellulose and xanthan. The fluid loss control materials may be used in combination with or separately from the conventional fluid loss control additives.

Chemical fluid loss control pills also may be used to combat fluid loss. Conventional chemical fluid loss control pills may be characterized as either solids-containing pills or solids-free pills. Examples of solids-containing pills include sized-salt pills and sized-carbonate pills. These solids-containing pills often are not optimized for the particular downhole hardware and conditions that may be encountered. For instance, the particle sizes of the solids may not be optimized for a particular application and, as a result, may increase the risk of invasion into the interior of the formation matrix, which may greatly increase the difficulty of removal by subsequent remedial treatments. Additionally, high-solids loading in the pills, in conjunction with the large volumes of these pills needed to control fluid losses, may greatly increase the complexity of subsequent cleanup. Furthermore, high loading of starches and biopolymers in the sized salt pills may add to the difficulty of cleanup either by flow back or remedial treatments. Solids-free fluid loss control pills commonly comprise hydrated polymer gels that may not be effective without some invasion into the formation matrix. These pills typically require large volumes to control fluid loss and remedial treatments to remove.

Once fluid loss control is no longer required, for example, after completing a fracturing treatment, remedial treatments may be required to remove the previously placed pills, for example, so that the wells may be placed into production. For example, a chemical breaker, such as an acid, oxidizer, or enzyme may be used to either dissolve the solids or reduce the viscosity of the pill. In many instances, however, use of a chemical breaker to remove the pill from inside the well bore and/or the formation matrix may be either ineffective or not a viable economic option. For example, due to production equipment in the well bore, uniform placement of the breaker into the portion of the formation treated with the pill may not be possible. Furthermore, the chemical breakers may be corrosive to downhole tools. Additionally, as the chemical breakers leak off into the formation, they may carry undissolved fines that may plug and/or damage the formation or may produce undesirable reactions with the formation.

SUMMARY

The present invention provides improvements in the production of hydrocarbons from subterranean formations. More particularly, the present invention provides improved solutions and methods for fracture stimulation in a subterranean formation while using a relative permeability modifier to reduce fluid leak off therefrom.

In one embodiment, the present invention provides a method comprising: providing a treatment fluid comprising an aqueous base fluid and a relative permeability modifier, wherein the relative permeability modifier comprises a water-soluble polymer having hydrophobic or hydrophilic modification; introducing the treatment fluid into an interval of a well bore penetrating the subterranean formation; creating one or more perforations through a hydrajetting tool in the interval of the well bore, wherein the perforations extend from the well bore and into the subterranean formation; and allowing the treatment fluid to contact a portion of the subterranean formation.

The features and advantages of the present invention will be apparent to those skilled in the art. While numerous changes may be made by those skilled in the art, such changes are within the spirit of the invention.

BRIEF DESCRIPTION OF DRAWINGS

These drawings illustrate certain aspects of some of the embodiments of the present invention, and should not be used to limit or define the invention.

FIG. 1 is a schematic diagram illustrating a stimulation system in a horizontal well bore in a portion of a subterranean formation in accordance with a method of the present invention.

While the present invention is susceptible to various modifications and alternative forms, a specific exemplary embodiment thereof has been shown by way of example in the drawing and are herein described in detail. It should be understood, however, that the description herein of specific embodiments is not intended to limit the invention to the particular form disclosed, but on the contrary, the intention is to cover all modifications, equivalents and alternatives falling within the spirit and scope of the invention as defined by the appended claims.

DESCRIPTION OF PREFERRED EMBODIMENTS

The present invention provides improvements in the production of hydrocarbons from subterranean formations. More particularly, the present invention provides improved solutions and methods for fracture stimulation of open hole completion in a subterranean formation while using a relative permeability modifier to reduce fluid leak off along the open hole section therefrom.

As used herein, a "relative permeability modifier" refers to a fluid loss control additive that comprises a water-soluble polymer having hydrophobic or hydrophilic modification. As used herein, "water-soluble" refers to at least about 0.01 weight percent soluble in distilled water. As used herein, the phrase "hydrophobically modified," or "hydrophobic modification," refers to the incorporation into the hydrophilic polymer structure of hydrophobic groups, wherein the alkyl chain length is from about 4 to about 22 carbons. As used herein, the phrase "hydrophilically modified," or "hydrophilic modification," refers to the incorporation into the hydrophilic polymer structure of hydrophilic groups, such as to introduce branching or to increase the degree of branching in the hydrophilic polymer. The methods and compositions of the present invention may be utilized in horizontal, vertical, inclined, or otherwise formed portions of wells.

The compositions and methods of the current invention are applicable in both newly drilled formations and in formations requiring re-stimulation. The compositions and methods of the current invention are particularly useful for formations where hydrocarbons will be present in the formation zones. In contrast to other viscosified or crosslinked compositions currently used to overcome annular fluid leak off, the compositions of the present invention retain their effectiveness while satisfying well completions limitations. Furthermore, the compositions of the present invention are non-damaging to hydrocarbon-bearing zones and have the potential to reduce water production from water-bearing zones.

In some embodiments, the methods of the present invention comprise providing a treatment fluid comprising an aqueous base fluid and a relative permeability modifier, placing the treatment fluid into an interval of a subterranean formation, and creating or enhancing at least one fracture therein. In some embodiments, the at least one fracture may be created or enhanced through fracture stimulation while a stimulation fluid is being pumped into the interval of the subterranean formation through coiled tubing and/or the annular space. In some embodiments, the methods of the present invention may comprise: providing a treatment fluid comprising a base fluid, providing a supplemental treatment fluid comprising an aqueous base fluid and a relative permeability modifier, introducing the treatment fluid through coiled tubing into a well bore penetrating a subterranean formation, introducing the supplemental treatment fluid through the annular space into the well bore, allowing the treatment fluid and supplemental treatment fluid to mix in the well bore, creating one or more perforations in an interval of the well bore, wherein the perforations extend from the well bore and into the subterranean formation, and allowing the mixture of treatment fluids to contact a portion of the subterranean formation through the one or more perforations. As used herein, the term "perforation" may refer to any fracture, crack, split, or division in the subterranean formation. These perforations may be created by a hydrajetting tool, for instance.

The treatment fluids of the present invention may comprise an aqueous base fluid and a relative permeability modifier to reduce fluid loss into at least a portion of the subterranean formation from the treatment fluid or another aqueous fluid (e.g. supplemental treatment fluid) introduced into the well bore subsequent to the treatment fluid. It is believed that the relative permeability modifier should attach to formation's surface(s), and thereby affect the permeability of the portion of the subterranean formation. The presence of the water-soluble polymers therein should reduce the permeability of the treated portion of the subterranean formation to aqueous or non-aqueous fluids without substantially changing the permeability thereof to subsequently produced or injected hydrocarbon fluids. This should reduce fluid loss into the treated portion from the treatment fluid and/or any other aqueous fluids (e.g., fracturing fluids, drilling fluids, isolation fluids, etc.) subsequently introduced into the well bore. For example, the methods of the present invention may be useful to control fluid loss during subsequent entry and/or removal of completion equipment into the well bore. In addition, the water-soluble polymers also may reduce subsequent problems associated with water flowing into the well bore from the treated portion of the subterranean formation.

Among other things, subsequent remedial treatments should not be required to remove the water-soluble polymers prior to placing the well into production. If desired, however, oxidizers may be used to remove the water-soluble polymer. For example, it may be desired, in some instances, to remove the water-soluble polymers so that fluids subsequently introduced into the formation can enter the formation. Examples of suitable oxidizers include, but are not limited to, alkali, alkaline earth, and transition metal salts of periodate, hypochlorite, perbromate, chlorite, chlorate; hydrogen peroxide; manganese peroxide; peracetic acid; and combinations thereof. In some embodiments, the volume of oxidizer used to remove the water-soluble polymer may be equal to the volume of relative permeability modifier in the system.

The treatment fluids of the present invention generally comprise an aqueous base fluid and a fluid loss control additive that comprises a water-soluble polymer having hydrophobic or hydrophilic modification. A variety of additional additives suitable for use in the chosen treatment may be included in the treatment fluids as desired. The aqueous base fluid of the treatment fluids of the present invention may include freshwater, saltwater, brine (e.g., saturated saltwater), or seawater. Generally, the aqueous base fluid may be from any source, provided that it does not contain components that may adversely affect other components in the treatment fluid.

Generally, the fluid loss control additives used in the treatment fluids of the present invention comprise a water-soluble polymer having hydrophobic or hydrophilic modification. A water-soluble polymer with hydrophobic modification is referred to herein as "hydrophobically modified." A water-soluble polymer with hydrophilic modification is referred to herein as "hydrophilically modified." Among other things the fluid loss control additives should reduce fluid loss from the treatment fluid or any other aqueous fluids subsequently introduced into the well bore. It is believed that after contact with surfaces within the formation's flow paths, at least a portion of the water-soluble polymer should attach to the surfaces, thereby reducing the permeability of the subterranean formation to aqueous fluids without substantially changing its permeability to hydrocarbons. Generally, the fluid loss control additive of the present invention is described in U.S. Pat. Nos. 7,117,942 and 7,182,136 and U.S. Patent Application Publication Nos. 2006/0137875, 2005/0199396, 2004/0229757, and 2004/0229756, the disclosures of which are incorporated herein by reference.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. The polar heteroatoms present within the polymer backbone of the hydrophobically modified polymers may include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction comprises an amino methacrylate/alkylammonium methacrylate copolymer. A suitable dimethylaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may comprise a dimethylaminoethyl methacrylate/hexadecyl-dimethylammoniumethyl methacrylate bromide copolymer.

In another embodiment of the present invention, the fluid loss control additives of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone that comprises polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized utilizing any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of the fluid loss control additives of the present invention should be present in the treatment fluids of the present invention to provide the desired level of fluid loss control. In some embodiments, the fluid loss control additives should be present in the treatment fluids of the present invention in an amount in the range of from about 0.02% to about 10% by weight of the treatment fluid. In another embodiment, the fluid loss control additive should be present in the treatment fluids of the present invention in an amount in the range of from about 0.05% to about 1.0% by weight of the treatment fluid. In certain embodiments of the present invention, the fluid loss control additive may be provided in a concentrated aqueous solution prior to its combination with the other components necessary to form the treatment fluids of the present invention.

Additional additives may be added to the treatment fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, acids, conventional fluid loss control additives, viscosifying agents, crosslinking agents, gel breakers, shale swelling inhibitors, combinations thereof, and the like.

The compositions of the present invention may be used in subterranean formations where it is desirable to provide fluid loss control. Generally, the fluid loss control additives may be used at any stage of a subterranean treatment. In certain embodiments, the treatment fluid may be a drilling fluid, a fracturing fluid, an isolation fluid, or any other suitable aqueous fluid used in subterranean treatments. In another embodiment, the treatment fluids may be a fluid loss control pill that is introduced into the well bore at any stage of the subterranean treatment. For example, the treatment fluid may be a preflush that is introduced into the well bore prior to the subterranean treatment.

In some embodiments, the compositions of the present invention may be used in conjunction with a hydrajet perforating, jetting while fracturing, and co-injection down the annulus technique. An example of such a process is generally referred to by Halliburton Energy Services, Inc. as the tradenamed "SURGIFRAC" process or stimulation method and is described in U.S. Pat. No. 5,765,642, the disclosure of which is incorporated herein by reference. Although this description is provided, it should be understood that the relative permeability modifier of the present invention is not limited to use with such methods, but may be used with any suitable fracture stimulation method in which it is desirable to control leak off of stimulation fluids. Thus, this description should not be found to limit the scope of the invention. A description of such preferred embodiments follows.

In preferred embodiments, the compositions of the present invention may be used in conjunction with a SURGIFRAC process. SURGIFRAC processes have been applied mostly to horizontal or highly deviated well bores, for example, where casing the hole is difficult and expensive. Once a wellbore is drilled, and if deemed necessary cased, a hydrajetting tool, such as that used in the SURGIFRAC process, may be placed into the wellbore at a location of interest, e.g., adjacent to a first zone in the subterranean formation. In one exemplary embodiment, the hydrajetting tool is attached to a coil tubing, which lowers the hydrajetting tool into the wellbore and supplies it with jetting fluid. An annulus is formed between the coil tubing and the wellbore. The hydrajetting tool then operates to form perforation tunnels in the first zone. The perforation fluid being pumped through the hydrajetting tool contains a base fluid, which is commonly water and abrasives (commonly sand), and may also comprise a relative permeability modifier. The fluid is then injected into the first zone of the subterranean formation. As those of ordinary skill in the art will appreciate, the pressure of the fluid exiting the hydrajetting tool is sufficient to fracture the formation in the first zone. Using this technique, the jetted fluid forms cracks or fractures along perforation tunnels. In a subsequent step, an acidizing fluid may be injected into the formation through the hydrajetting tool. The acidizing fluid may comprise a relative permeability modifier. The acidizing fluid etches the formation along the cracks thereby widening them. As those of ordinary skill in the art will recognize, the hydrajetting tool may have any number of jets, configured in a variety of combinations along and around the tool.

By using a hydrajetting technique, it is possible to generate one or more independent, single plane hydraulic fractures; and therefore, highly deviated or horizontal wells may be often completed without having to case the wellbore. Furthermore, even when highly deviated or horizontal wells are cased, hydrajetting the perforations and fractures in such wells generally may result in a more effective fracturing method than using traditional explosive charge perforation and fracturing techniques.

Each of the fractures typically formed is believed to have a narrow opening that extends laterally from the well bore. In some embodiments, to prevent such an opening from closing completely when the fracturing pressure is relieved, the fracturing fluid may carry granular or particulate materials, often referred to as "proppant," into the opening of the fracture and deep into the fracture. This material remains in each of the fractures after the fracturing process is finished. Ideally, the proppant in each of the fractures holds apart the separated earthen walls of the formation to keep the fracture open and to provide flow paths through which hydrocarbons from the formation may flow into the well bore at increased rates relative to the flow rates through the unfractured formation. The proppant material may include natural and man-made proppant agents, such as sand, bauxite, ceramic materials, glass materials (e.g., glass beads), polymer materials, TEFLON™ materials (Poly(tetrafluoroethene)), nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. Alternatively, the proppant material may include paraffin, encapsulated acid or other chemical, or resin beads.

Once the first zone has been fractured, the present invention provides for isolating the first zone, so that subsequent well operations, such as the fracturing of additional zones, may be carried out without the loss of significant amounts of fluid. This isolation step may be carried out in a number of ways. In one exemplary embodiment, the isolation step may be carried out by injecting into the wellbore an isolation fluid, which may comprise a relative permeability modifier. In one embodiment, the isolation fluid may be injected into the wellbore by pumping it from the surface down the annulus. In one implementation of this embodiment, the isolation fluid may not be pumped into the wellbore until after the hydrajetting tool has moved up hole. In another implementation of this embodiment, the isolation fluid may be pumped into the wellbore, possibly at a reduced injection rate than the fracturing operation, moving the hydrajetting tool along the wellbore before the fracturing process or before the hydrajetting tool has moved up hole. In one exemplary embodiment, the isolation fluid is mixed with a proppant material.

After an isolation fluid is pumped in the wellbore or delivered into the wellbore adjacent fractures, a second zone in the subterranean formation may be fractured. If the hydrajetting tool has not already been moved within the portion of the wellbore adjacent to the second zone, then it is moved there after the first zone has been plugged or partially sealed by the isolation fluid. Once adjacent to the second zone, the hydrajetting tool operates to perforate the subterranean formation in the second zone thereby forming perforation tunnels. Next, the subterranean formation is fractured to form fractures either using conventional techniques or more preferably the hydrajetting tool. Next, the fractures are extended by continued fluid injection and using either proppant agents or acidizing fluids, or any other known technique for holding the fractures open and conductive to fluid flow at a later time. The fractures may then be plugged or partially sealed by the isolation fluid using the same techniques discussed above with respect to the fractures. The method may be repeated where it is desired to fracture additional zones within the subterranean formation. Once all of the desired zones have been fractured, the isolation fluid may be recovered thereby unplugging the fractures for subsequent use in the recovery of hydrocarbons from the subterranean formation.

The following is an another method of completing a well in a subterranean formation in accordance with the present invention. First, a wellbore may be drilled in a subterranean formation. Next, a first zone in the subterranean formation may be perforated by injecting a pressurized fluid through the hydrajetting tool into the subterranean formation, so as to form one or more perforation tunnels. During the performance of this step, the hydrajetting tool may be kept stationary. Alternatively, however, the hydrajetting tool may be fully or partially rotated so as to cut slots into the formation. Alternatively, the hydrajetting tool may be axially moved or a combination of rotated and axially moved within the wellbore so as to form a straight or helical cut or slot. Next, one or more fractures may be initiated in the first zone of the subterranean formation by injecting a fracturing fluid into the one or more perforation tunnels through the hydrajetting tool. The fracturing fluid may comprise a relative permeability modifier. Initiating the fracture with the hydrajetting tool is advantageous over conventional initiating techniques because this technique may allow for a lower breakdown pressure on the formation. Furthermore, it may result in a more accurate and better quality perforation.

Additional fracturing fluid may be pumped down the annulus simultaneous with or as soon as the one or more fractures are initiated, so as to propagate the fractures. The additional fracturing fluid may comprise a relative permeability modifier. After the fractures have been initiated, the hydrajetting tool may be moved up hole. This step may be performed while the fracturing fluid is being pumped down through the annulus to propagate the fractures. The rate of fluid being discharged through the hydrajetting tool may be decreased and even may be halted altogether once the fractures have been initiated. The annulus injection rate may or may not be increased at this juncture in the process.

After fractures have been propagated and the hydrajetting tool has been moved up hole, the isolation fluid in accordance with the present invention may be pumped into the wellbore adjacent to the first zone. Over time the isolation fluid may plug the one or more fractures in the first zone. Those of skill in the art will appreciate that the isolation fluid may permeate into the fractures. The steps of perforating the formation, initiating the fractures, propagating the fractures and plugging or partially sealing the fractures are repeated for as many additional zones as desired. After all of the desired fractures have been formed, the isolation fluid may be removed from the subterranean formation.

The hydrajetting tool comprises a main body, which is cylindrical in shape and formed of a ferrous metal. The main body has a top end and a bottom end. The top end may connect to coil tubing for operation within the wellbore. The main body may have a plurality of nozzles, which are adapted to direct the high pressure fluid out of the main body. The nozzles may be disposed, and in one certain embodiment are disposed, at an angle to the main body, so as to eject the pressurized fluid out of the main body at an angle other than 90°. The hydrajetting tool may further comprise a means for opening the hydrajetting tool to fluid flow from the wellbore. Such fluid opening means includes a fluid-permeable plate, which is mounted to the inside surface of the main body. The fluid-permeable plate traps a ball, which sits in seat when the pressurized fluid is being ejected from the nozzles. When the pressurized fluid is not being pumped down the coil tubing into the hydrajetting tool, the wellbore fluid is able to be circulated up to the surface via opening means. More specifically, the wellbore fluid lifts the ball up against fluid-permeable plate, which in turn allows the wellbore fluid to flow up the hydrajetting tool and ultimately up through the coil tubing to the surface. As those of ordinary skill in the art will recognize other valves may be used in place of the ball and seat arrangement. Darts, poppets, and even flappers, such as a balcomp valves, may be used. Furthermore, such valves may be placed both at the top and the bottom, as desired. As is well known in the art, a positioning device, such as a gamma ray detector or casing collar locator may be included in the bottom hole assembly to improve the positioning accuracy of the perforations.

FIG. 1 depicts an example of a stimulation system 100 installed in well bore 102 that penetrates subterranean formation 104 in accordance with an embodiment of the present invention. Well bore 102 includes generally vertical portion 110, which extends to the ground surface (not shown), and generally horizontal portion 112, which extends into subterranean formation 104. Even though FIG. 1 depicts well bore 102 as a deviated well bore with generally horizontal portion 112, the methods of the present invention may be performed in generally vertical, inclined, or otherwise formed portions of wells. In addition, well bore 102 may include multilaterals, wherein well bore 102 may be a primary well bore having one or more branch well bores extending therefrom, or well bore 102 may be a branch well bore extending laterally from a primary well bore. Furthermore, well bore 102 may be open-hole (not shown) or lined with casing 120 as shown in FIG. 1. In FIG. 1, casing 120 extends from the ground surface (not shown) into well bore 102 that penetrates subterranean formation 104. Casing 120 may or may not be cemented to subterranean formation 104 with a cement sheath. Stimulation system 100 includes work string 200, in the form of piping or coiled tubing, jetting tool 202 coupled at an end thereof, and an optional valve subassembly (not shown) coupled above jetting tool 202. Annulus 204 is formed between subterranean formation 104 and work string 200, and jetting tool 202. Completion tubing 206 and isolation packer 208 may also be placed to isolate a portion of subterranean formation 104.

Therefore, the present invention is well-adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. In particular, as those of skill in the art will appreciate, steps from the different methods disclosed herein may be combined in a different manner and order. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of fracturing a subterranean formation comprising:
providing a treatment fluid comprising an aqueous base fluid and a relative permeability modifier, wherein the relative permeability modifier comprises a water-soluble polymer comprising a polymer backbone comprising polar heteroatoms and wherein the water-soluble polymer comprises at least one water-soluble polymer selected from the group consisting of:
a hydrophobically modified polymer comprising a reaction product of a reaction comprising a hydrophilic polymer and a hydrophobic compound, wherein the hydrophobic compound is an organic acid; and,
a hydrophobically modified polymer comprising a reaction product of a polymerization reaction comprising a hydrophilic monomer and a hydrophobically modified hydrophilic monomer wherein the hydrophobic modification is an organic acid; and
positioning a hydrajetting tool in an interval of a well bore penetrating the subterranean formation;
injecting the treatment fluid through the hydrajetting tool into the interval at a pressure sufficient to form a fracture in the subterranean formation; and then,
injecting an acidizing fluid into the interval through the hydrajetting tool.

2. The method of claim 1 wherein the hydrajetting tool is kept stationary while the treatment fluid is injected into the interval of the well bore.

3. The method of claim 1 further comprising introducing an oxidizer into the interval of the well bore.

4. The method of claim 1 further comprising depositing proppant into the fracture.

5. The method of claim 1 further comprising:
introducing an isolation fluid into the interval of the well bore;
moving the hydrajetting tool to a second interval of the well bore; and
introducing the treatment fluid into the second interval of the well bore.

6. The method of claim 1 wherein the relative permeability modifier is present in the treatment fluid in an amount up to about 10% by weight of the treatment fluid.

7. The method of claim 1 wherein the water-soluble polymer comprises the hydrophobically modified polymer comprising a reaction product of a reaction comprising a hydrophilic polymer and a hydrophobic compound, wherein the hydrophobic compound is an organic acid.

8. The method of claim 7 wherein the hydrophilic polymer comprises at least one polymer selected from the group consisting of: a cellulose; a chitosan; a polyamide; a polyetheramine; a polyethyleneimine; a polyhydroxyetheramine; a polylysine; a polysulfone; a gum; a starch; and derivatives thereof.

9. The method of claim 7 wherein the water-soluble polymer comprises an amino group quaternized to include the hydrophobic compound.

10. The method of claim 7 wherein the water-soluble polymer has a mole ratio of hydrophilic monomer to the hydrophobic compound in the range of from about 99.98:0.02 to about 90:10.

11. The method of claim 1 wherein the water-soluble polymer has a molecular weight in the range of from about 100,000 to about 10,000,000.

12. A method of fracturing a subterranean formation comprising:
providing a treatment fluid comprising a base fluid;
providing a supplemental treatment fluid comprising an aqueous base fluid and a relative permeability modifier, wherein the relative permeability modifier comprises a water-soluble polymer comprising a polymer backbone comprising polar heteroatoms and wherein the water-soluble polymer comprises at least one water-soluble polymer selected from the group consisting of:
a hydrophobically modified polymer comprising a reaction product of a reaction comprising a hydrophilic polymer and a hydrophobic compound, wherein the hydrophobic compound is an organic acid; and, a hydrophobically modified polymer comprising a reaction product of a polymerization reaction comprising a hydrophilic monomer and a hydrophobically modified hydrophilic monomer wherein the hydrophobic modification is an organic acid; and injecting the treatment fluid through a hydrajetting tool coupled to a work string into an interval of a well bore penetrating a subterranean formation at a pressure sufficient to form a fracture in the subterranean formation; and injecting the supplemental treatment fluid into an annulus formed by the outer surface of the work string and an inner wall of the well bore formation; and then, injecting an acidizing fluid into the interval through the hydrajetting tool.

13. The method of claim 12 wherein the hydrajetting tool is kept stationary while the treatment fluid is injected into the interval of the well bore.

14. The method of claim 12 further comprising depositing proppant into the fracture.

15. A method of fracturing a subterranean formation comprising:

providing a treatment fluid comprising an aqueous base fluid and a relative permeability modifier, wherein the relative permeability modifier comprises a water-soluble polymer comprising a polymer backbone comprising polar heteroatoms and wherein the water-soluble polymer comprises a hydrophobically modified polymer comprising a reaction product of a reaction comprising a hydrophilic polymer and a hydrophobic compound selected from the group consisting of: an anhydride of octenyl succinic acid, an ester of octenyl succinic acid, an imide of octenyl succinic acid, an amide of octenyl succinic acid, an anhydride of dodecenyl succinic acid, an ester of dodecenyl succinic acid, an imide of dodecenyl succinic acid, and an amide of dodecenyl succinic acid;

positioning a hydrajetting tool in an interval of a well bore penetrating the subterranean formation; and injecting the treatment fluid through the hydrajetting tool into the interval at a pressure sufficient to form a fracture in the subterranean formation.

16. The method of claim 15 wherein the hydrajetting tool is kept stationary while the treatment fluid is injected into the interval of the well bore.

17. The method of claim 15 further comprising introducing an oxidizer into the interval of the well bore.

18. The method of claim 15 further comprising depositing proppant into the fracture.

19. The method of claim 15 further comprising:

introducing an isolation fluid into the interval of the well bore;

moving the hydrajetting tool to a second interval of the well bore; and introducing the treatment fluid into the second interval of the well bore.

20. The method of claim 15 wherein the relative permeability modifier is present in the treatment fluid in an amount up to about 10% by weight of the treatment fluid.

21. The method of claim 15 wherein the water-soluble polymer has a molecular weight in the range of from about 100,000 to about 10,000,000.

* * * * *